US 6,618,750 B1

(12) United States Patent
Staats

(10) Patent No.: US 6,618,750 B1
(45) Date of Patent: Sep. 9, 2003

(54) METHOD AND APPARATUS FOR DETERMINING COMMUNICATION PATHS

(75) Inventor: Erik P. Staats, Ben Lomond, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/432,915

(22) Filed: Nov. 2, 1999

(51) Int. Cl.$^7$ .............................................. G06F 15/16
(52) U.S. Cl. ........................ 709/209; 709/221; 709/242
(58) Field of Search ............................... 709/321, 227, 709/221, 228, 209, 231, 220, 242; 725/16; 711/147; 370/349

(56) References Cited

U.S. PATENT DOCUMENTS

| | | | |
|---|---|---|---|
| 4,156,798 A | 5/1979 | Doelz ..................... 179/15 AL |
| 4,194,113 A | 3/1980 | Fulks et al. .................... 371/20 |
| 5,014,262 A | 5/1991 | Harshavardhar ............. 370/16 |
| 5,274,631 A | 12/1993 | Bhardwaj .................... 370/60 |
| 5,343,461 A | 8/1994 | Barton et al. ................. 370/13 |
| 5,394,556 A | 2/1995 | Oprescu |
| 5,406,643 A | * 4/1995 | Burke et al. ................ 370/349 |
| 5,452,330 A | 9/1995 | Goldstein .................... 375/257 |
| 5,490,253 A | 2/1996 | Laha et al. |
| 5,495,481 A | 2/1996 | Duckwall .................. 370/85.2 |
| 5,539,390 A | 7/1996 | Nagano et al. ......... 340/825.07 |
| 5,541,670 A | 7/1996 | Hanai .......................... 348/705 |
| 5,568,641 A | 10/1996 | Nelson |
| 5,583,922 A | 12/1996 | Davis et al. ............. 379/93.09 |
| 5,621,659 A | 4/1997 | Matsumoto et al. |
| 5,630,173 A | 5/1997 | Oprescu |
| 5,640,595 A | 6/1997 | Baugher et al. |
| 5,642,515 A | * 6/1997 | Jones et al. .................. 709/227 |
| 5,684,715 A | 11/1997 | Palmer ........................ 365/514 |
| 5,701,476 A | 12/1997 | Fenger |
| 5,701,492 A | 12/1997 | Wadsworth et al. |
| 5,712,834 A | 1/1998 | Nagano et al. ................ 369/19 |
| 5,719,862 A | 2/1998 | Lee et al. .................... 370/355 |
| 5,784,648 A | 7/1998 | Duckwall |
| 5,802,048 A | 9/1998 | Duckwall .................... 370/389 |
| 5,802,057 A | 9/1998 | Duckwall et al. ........... 370/408 |

(List continued on next page.)

OTHER PUBLICATIONS

Roca et al., Demultiplexed Architectures: A Solutiton for Efficient Streams–Based Communication Stacks, Jul./Aug. 1997, IEEE Network, pp. 16–26.*

Raza et al., Network Configuration with Plug–and–Play Components, 1999, IEEE, pp. 937–938.*

Wyss et al., Probabilistic Logic Modeling of Network Reliability for Hybrid Network Architectures, Oct. 1996, Proceedings 21$^{st}$ IEEE, pp. 404–413.*

"Information Technology–Microprocessor Systems–Control and Status Registers (CSR) Architecture for Microcomputer Buses", ANSI/IEEE Standard 1212, The Institute of Electrical and Electronics Engineers, Inc. pp. I–122, 1994 Edition.

"IEEE Standard for a High Performance Serial Bus", IEEE Standard 1394–1995, Institute of Electrical and Electronics Engineers, Inc., Aug. 30, 1996.

(List continued on next page.)

Primary Examiner—Kenneth R. Coulter
Assistant Examiner—Chau Nguyen
(74) Attorney, Agent, or Firm—Sierra Patent Group, Ltd.

(57) ABSTRACT

Disclosed herein is a system for determining communication paths, especially for AV/C devices. The system includes gathering pertinent information about drivers in each available communication between nodes in the system and ordering the driver information in a communication path list string. The system may be employed with multiple nodes having one or more communication paths between nodes. The system may also be employed with multiple nodes where at least one of the nodes is a bridge.

5 Claims, 3 Drawing Sheets

U.S. PATENT DOCUMENTS

| | | | |
|---|---|---|---|
| 5,802,365 A | * 9/1998 | Kathail et al. | 709/321 |
| 5,805,073 A | 9/1998 | Nagano et al. | 340/825.07 |
| 5,809,331 A | 9/1998 | Staats et al. | |
| 5,819,115 A | * 10/1998 | Hoese et al. | 710/68 |
| 5,826,027 A | * 10/1998 | Pedersen et al. | 709/221 |
| 5,832,298 A | 11/1998 | Sanchez et al. | |
| 5,835,761 A | 11/1998 | Ishii et al. | |
| 5,867,730 A | 2/1999 | Leyda | |
| 5,875,301 A | 2/1999 | Duckwall et al. | |
| 5,938,764 A | 8/1999 | Klein | 713/1 |
| 5,968,152 A | 10/1999 | Staats | 710/104 |
| 5,970,052 A | 10/1999 | Lo et al. | 370/241 |
| 5,987,605 A | 11/1999 | Hill et al. | 713/2 |
| 6,009,480 A | * 12/1999 | Pleso | 710/8 |
| 6,032,202 A | 2/2000 | Lea et al. | 710/8 |
| 6,038,625 A | 3/2000 | Ogino et al. | 710/104 |
| 6,070,187 A | 5/2000 | Subramaniam et al. | 709/220 |
| 6,073,206 A | 6/2000 | Piwonka et al. | 711/102 |
| 6,122,248 A | 9/2000 | Murakoshi et al. | 370/216 |
| 6,131,129 A | 10/2000 | Ludtke | 710/5 |
| 6,133,938 A | 10/2000 | James | 348/8 |
| 6,138,196 A | 10/2000 | Takayama et al. | 710/105 |
| 6,141,702 A | 10/2000 | Ludtke et al. | 710/5 |
| 6,141,767 A | 10/2000 | Hu et al. | 714/1 |
| 6,157,972 A | 12/2000 | Newman et al. | 710/100 |
| 6,160,769 A | 12/2000 | Ohnuki et al. | 370/257 |
| 6,167,532 A | 12/2000 | Wisecup | 713/300 |
| 6,173,327 B1 | 1/2001 | De Borst et al. | 709/231 |
| 6,192,189 B1 | 2/2001 | Fujinami et al. | 386/96 |
| 6,202,210 B1 | * 3/2001 | Ludtke | 725/16 |
| 6,233,615 B1 | 5/2001 | Van Loo | 709/224 |
| 6,233,624 B1 | 5/2001 | Hyder et al. | 709/327 |
| 6,247,083 B1 | 6/2001 | Hake et al. | 710/107 |
| 6,253,114 B1 | 6/2001 | Takihara | 700/83 |
| 6,253,255 B1 | 6/2001 | Hyder et al. | 709/321 |
| 6,260,063 B1 | 7/2001 | Ludtke et al. | 709/224 |
| 6,266,334 B1 | 7/2001 | Duckwall | 370/397 |
| 6,266,344 B1 | 7/2001 | Fujimori et al. | 370/468 |
| 6,266,701 B1 | 7/2001 | Sridhar et al. | 709/232 |
| 6,282,597 B1 | 8/2001 | Kawamura | 710/105 |
| 6,292,840 B1 | * 9/2001 | Blomfield-Brown et al. | 709/227 |
| 6,295,479 B1 | 9/2001 | Shima et al. | 700/83 |
| 6,308,222 B1 | 10/2001 | Krueger et al. | 709/247 |
| 6,311,228 B1 | 10/2001 | Ray | 709/301 |
| 6,345,315 B1 | 2/2002 | Mishra | 709/329 |
| 6,347,362 B1 | * 2/2002 | Schoinas et al. | 711/147 |
| 6,353,868 B1 | 3/2002 | Takayama et al. | 710/129 |
| 6,363,085 B1 | 3/2002 | Samuels | 370/502 |
| 6,385,679 B1 | 5/2002 | Duckwall et al. | 710/119 |

OTHER PUBLICATIONS

"IEEE Standard for a High Performance Serial Bus–Amendment 1", Institute of Electrical and Electronics Engineers, Inc., pp. 1–196, 2000 (no month).

"AV/C Digital Interface Command Set General Specification, Rev. 3.0", 1394 Trade Association, pp. 4–5, 20–34, Apr. 15, 1998.

"Enhancements to the AV/C General Specification 3.0 Version 1.0FC1", 1394 Trade Association, pp. 4, 6–17, Nov. 5, 1998.

"Fibre Channel–Methodologies for Jitter Specification", NCITS TR–25–1999, Jitter Working Group Technical Report, Rev. 10, pp. 1–96, Jun. 9, 1999.

* cited by examiner

METHOD AND APPARATUS FOR DETERMINING COMMUNICATION PATHS

BACKGROUND OF THE INVENTION

1. Field of the Invention

This invention relates to communication path determination techniques. More particularly, this invention relates to methods for determining communication paths between devices where multiple coupling, mechanisms are implicated.

2. The Prior Art

The IEEE 1394 multimedia bus standard is to be the "convergence bus" bringing together the worlds of the PC and digital consumer electronics. It is readily becoming the digital interface of choice for consumer digital audio/video applications, providing a simple, low-cost and seamless plug-and-play interconnect for clusters of digital A/V devices, and it is being adopted for PCs and peripherals.

The original specification for 1394, called IEEE 1394–1995, supported data transmission speeds of 100 to 400 Mbits/second. Most consumer electronic devices available on the market have supported either 100 or 100/200 Mbits/second; meaning that plenty of headroom remains in the 1394 specification. However, as more devices are added to a system, and improvements in the quality of the A/V data (i.e., more pixels and more bits per pixel) emerge, a need for greater bandwidth and connectivity flexibility has been indicated.

The 1394a specification (pending approval) offers efficiency improvements, including support for very low power, arbitration acceleration, fast reset and suspend/resume features. However, not all devices meet the 1394 specification and not all devices communicate by way of the same protocols.

In distributed driver architectures, multiple communication paths may sometimes be available for controlling a remote device. For example, a 1394 and RS-232 serial connection may exist between two nodes implementing a distributed driver architecture. In order to determine the best connection to use, an application has to be able to determine the communication path of each connection.

Old methods of distributed driver architectures (e.g., the Home Audio/Video interoperability, or HAVi, architecture) do not provide any means of ascertaining the communication path used to access a remote device. Only an ID is given for the end device. In the case where two communication paths are available, some implementations may provide two distinct IDs but no means for determining the communication path used for each ID.

BRIEF DESCRIPTION OF THE INVENTION

This invention provides a method for determining the communication paths used to access remote devices. In the case of two nodes connected by two paths and an ID for each path for a remote device, this invention provides a means of ascertaining the communication path associated with each ID.

In one implementation of this invention, each driver in the distributed system provides a device name stack service which returns a string containing an ordered list of the names of the drivers in the driver stack. For most drivers in a driver stack, this service calls the device name stack service for the next driver down the stack and then adds the name of the current driver. This recursive procedure will produce the ordered list of the names of the drivers in the driver stack where the highest layer driver name is first and the lowest layer driver name is last.

In the case of distributed drivers, the device name stack service starts by performing activities within the capabilites of regular local drivers. This first activity produces a list of names of drivers down to the lowest driver used for transmitting messages to the remote node. The resulting string only contains local driver names. It does not provide any information about the remote node. Thus, the second activity of the device name stack service sends a message to the remote node requesting its device name stack service. The receiving driver will have two driver stacks below it, one for the messaging stack and the other for the target device driver stack. The remote driver's device name stack service then calls the device name stack service for its messaging stack and reverses the order of the list of driver names; thus the lowest layer driver name is first and the highest layer, that of the remote driver, is last. Then, the remote driver's device name stack service calls the device name stack service for its target device driver stack and appends the result to the reversed messaging device name stack and returns it to the local node. The local device name stack service appends the remote device name stack to the local device name stack which results in an ordered list of device driver names participating in the communication path between the local node's application and the remote target device.

This same method may be used to produce a list of device classes, device unique IDs, or any other information desired of the communication path. That is, instead of merely indentifying the drivers, path specific information may be obtained instead. For instance, instead of ascertaining that the path in question includes a 1394 link, perhaps throughput information would be provided.

This method may also be used in a bridged system where the remote target device resides on a different bus from the local node with an intermediate bridge node. In this manner, a path including the bridge may be ascertained as may be useful in certain applications.

The information provided by the device name stack may be used by a controlling application to determine the best communication path to use when multiple paths are available for the same remote target device. Thus, in the case where both 1394 and RS-232 communcation paths are available, the application can determine which device driver ID corresponds to the 1394 path and use that one due to it's higher performance capabilities.

Therefore it is an object of the present invention to detemine communication paths is a system of nodes.

It is another object of the present invention to differentiate one of many communication paths amongst a plurality of nodes in a system.

It is yet another object of the present invention to provide the communication paths determined in an ordered string including relevant driver information therein.

Viewed from a first vantage point a method for building a communication path representation is disclosed, comprising in combinaiton, getting driver information for each driver in the path; ordering said driver information sequentially in a list; and presenting said list upon request to requesting applicaitons.

Viewed from a second vantage point a communication path determination system is disclosed, comprising in combination, a plurality of nodes; one or more communication paths coupling said plurality of nodes to each other; and means for defining said communication paths in ordered lists.

Viewed from a third vantage point in a memory space, a method for determining a communication path is disclosed, comprising in combination, starting a local name stack service; gathering information about all local drivers on one or more communication paths; adding said local driver information to one or more ordered lists correlated to each communication path; starting a remote node name stack service; gathering information about all remote node drivers; ordering said remote node driver information in a list; and adding, said remote node ordered list to said local node ordered list.

BRIEF DESCRIPTION OF THE DRAWING FIGURES

DETAILED DESCRIPTION OF A PREFERRED EMBODIMENT

Persons of ordinary skill in the art will realize that the following description of the present invention is illustrative only and not in any way limiting. Other embodiments of the invention will readily suggest themselves to such skilled persons having the benefit of this disclosure.

Generally, a recursive method is disclosed for building a communication path string, wherein a plurality of devices may include a plurality of communication paths between each of the plural devices. In particular, where multiple nodes are coupled together via multiple communication paths, this system provides point to point driver data regarding available paths. By providing such available path information, an application, for example, may then use that path information to make a path selection determination. Alternatively, the above mentioned application may present the path data in a user understandable format to a user so that the user may manually select a desired communication path via the application.

Figure 1:
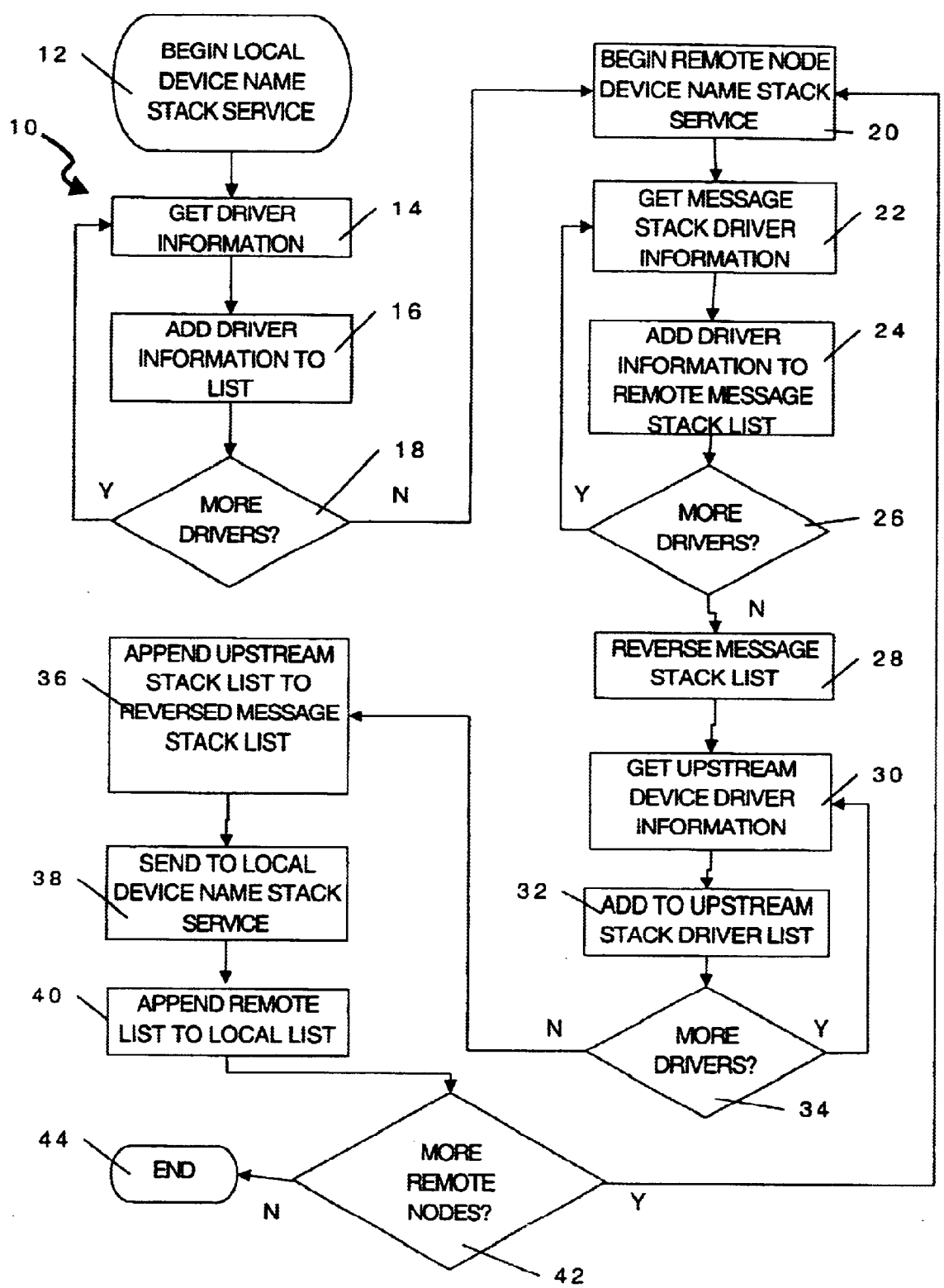
FIG. 1 is flowchart of a method for building a communication path string of the present invention.

Referring now to FIG. 1 a system for building a device communication path string 10 is depicted. This system is initiated by a call or request for communication path data from, for example, an application on a local node to the local device name stack service. As indicated in block 12, a device name stack service is first initiated at a first local driver downstream from the application. The device name stack service is a rudimentary service included with each driver that performs the function of providing its driver information in response to such a call and passing the request along with its added driver information to the next driver downstream. This process is continued until the ultimate or last driver provides its information and then the path information is returned in the form of a string to the requesting application.

That is, once the name stack service is initiated, as in block 12, the driver first in line provides certain self-descriptive information as in block 14. That self-descriptive driver information is then added to a (initially blank) dynamically constructed communication path string. The string will be compiled in such a manner as to provide all obtained self-descriptive driver information from each and every driver in the path in an end to end, driver by driver, list. Once the first driver adds its self-descriptive information to the list, it will then pass the request on to the next local driver until all local drivers have similarly added their self-descriptive information to the string as in blocks 16 and 18.

Thereafter, once all local driver information is gathered, the local device name stack service sends a request to the next remote node. The remote node, then, initiates its device name stack service to collect all of its driver information as in block 20. A remote node will differ from a local node in that the remote node will also include the target device which is intended to receive messages from the local node application. The name stack service on the remote node then will have two stack lists to compile. The first is that side in closer proximity to the local node, or what is called the message stack. The second is that which is in close proximity to the target device, which is called the target device driver stack.

Hence, once initiated as in block 20, the remote node device name stack service gathers its message stack drivers one at a time until all message stack drivers are listed in a string as in blocks 22–26. Then, after all of the message stack drivers are thusly assembled, the stack order is reversed as in block 28. This is done to provide the stack order in an ordered path when viewed from the perspective of the local node. Before reversing the stack, the drivers are ordered with a view from the top of the remote node.

Thereafter, the remote node calls upon the target device drivers for their driver information as in block 30. Again, the drivers are gathered in order from the top of the node as in blocks 32 and 34, which is now in a proper order, at least as viewed from the perspective of the local node. Once all of the target device drivers are so gathered, that stack list is appended to the reversed message stack list as in block 36. Hence, at this point, at least form the perspective of the local node, an ordered list of this remote node's drivers has been compiled in a string.

That string is then sent to the local device name stack service as in block 38. The local device name stack service then appends the remote string list to its previously assembled local driver stack list string as in block 40. This same process is accomplished for each available communication path between the local application and the target device. If no more remote nodes exist, this process is complete and includes an ordered list of all drivers between the application and the target as in block 44. If, on the other hand, there are additional remote nodes between the application and the target device, then, as block 42 indicates, this same process will recurse back to block 20 and gather that remote node's driver information.

Figure 2:
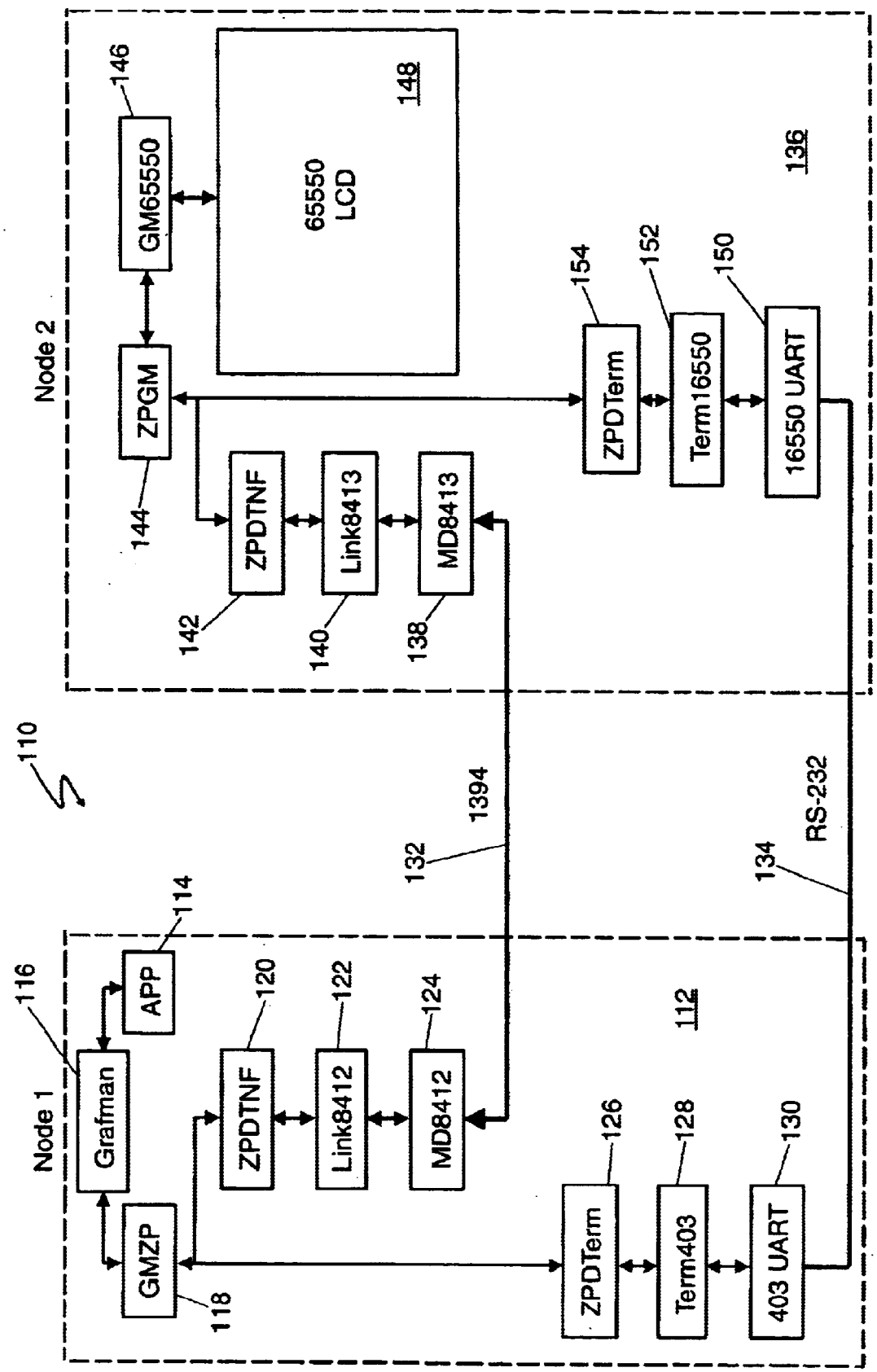
FIG. 2 is a schematic drawing of a first embodiment of the present invention.

In use and operation, and referring now to FIG. 2, an exemplary embodiment 110 is depicted. This embodiment includes a local node 112 (node 1) and a remote node 136 (node 2). The nodes 112 and 136 are coupled to one another via both a 1394 connection 132 and an RS-232 connection 134. Therefore, two available communication paths exist between nodes 1 and 2 which may be utilized by an application 114 on the local node 112 to serve up messages on the target device 148 (an LCD display) on the remote node 136. Hence, it would be desirable for the application 114, or a user thereof, to be privy to information regarding each of the available communication paths so that one or the other or both may be selected for transport of messages from the application 114 to the target device 148.

In this example, then, upon the sending of a communication path request by application 114, the local device name stack service initiates. The local device name stack service preferably resides within an IO coordinator between application 114 and GMZP 118. The local device name stack service is in operative communication with GMZP 118, a local graphics client driver. For reference purposes, grafman 116 is a rudimentary graphics software program which is able to convert linedraw messages from application 114 into appropriate graphics commands that will be understood by an LCD graphics driver, such as the one located on the remote node 136 as GM65550.

Upon receipt of the path request from application 114, then, as shown in FIG. 1, the local device name service begins the dynamic path string building routine. Therefore, as the GMZP driver 118 is first in line from the application 114, certain GMZP self-descriptive information is added to a string, such as its name: "/GMZP". Of course, other information could be included in the string instead, such as, "client_driver", depending on the needs of the system.

Thereafter, two driver stacks are encountered locally. One is related to the 1394 stack and one is related to the RS-232 stack. Each will be addressed individually, though the paths are compiled sequentially. Referring then to the 1394 local stack, the next driver encountered is ZPDTNF 120 (a 1394 transport driver). ZPDTNF 120 is thus added to the path string resulting in: "/GMZP/ZPDTNF". Likewise, the 1394 link driver, Link8412 122, for the physical link MD 8412 124 is added next to the string, resulting in: "/GMZP/ZPDTNF/Link8412". Hence, the local 1394 stack has been built, moving the process to block 20 of FIG. 1.

Hence, the local device name service stack next sends a request to the remote node 136 for its path information. Similarly, on the RS-232 branch, the following is built locally, prior to sending a request to the remote node 136: "/GMZP/ZPDTerm/Term403". Where ZPDTerm 126 is a terminal driver for RS-232 bus communication and Term403 128 is a link driver for the 403 UART physical link 130.

Next, the remote node device name stack service queries its message stack drivers for their information. That is, the message stack includes those drivers on the message transport side of ZPGM 144 (remote node graphics server driver) as opposed to the target device drivers on the target device side of ZPGM 144. Put another way, the message stack includes, in the case of the 1394 communication path, ZPDTNF 142 (a 1394 transport driver), and Link8413 140 (the remote node 136 1394 link driver for the MD8413 physical link 138). Thus, the following remote device name message string is built: "/ZPDTNF/Link8413". Then, as in block 28 of FIG. 1, this message string is reversed to form: "/Link8413/ZPDTNF".

Next, the target device drivers are compiled in order. Therefore, ZPGM 144 adds itself to the target list as: "ZPGM". Then, the LCD65550 display device 148 driver GM65550 146 adds itself to the list in turn forming: "ZPGM/GM65550". This target device driver string is then appended to the remote node message driver string to form: "/Link8413/ZPDTNF/ZPGM/GM65550". Thus forming the remote node device driver communication path in toto. Then, to complete the process for the 1394 communication path, the remote node message driver string is sent to the local node device name stack service to be appended to the local driver string to form: "/GMZP/ZPDTNF/Link8412/Link8413/ZPDTNF/ZPGM/GM65550". This then provides a complete list of drivers, in order, for this 1394 communication path.

Likewise, for the RS-232 path, the remote message driver path will be built as: "/ZPDTerm/Term16550". When reversed it becomes, of course: "/Term16550/ZPDTerm". The target path is the same as that for the 1394 path above, namely: "/ZPGM/GM65550". When added together they form the remote node driver path: "/Term16550/ZPDTerm/ZPGM/GM65550". Thereafter, this remote node driver path is sent to the local node 112 where the local device name service receives same and appends it to the local driver path forming: "/GMZP/ZPDTerm/Term403/Term16550/ZPDTerm/ZPGM/GM65550".

Thereafter, the local device name service will report both strings back to the requesting application 114. The application 114 or a user thereof may then ascertain additional path information as so provided within the communication path strings.

Figure 3:
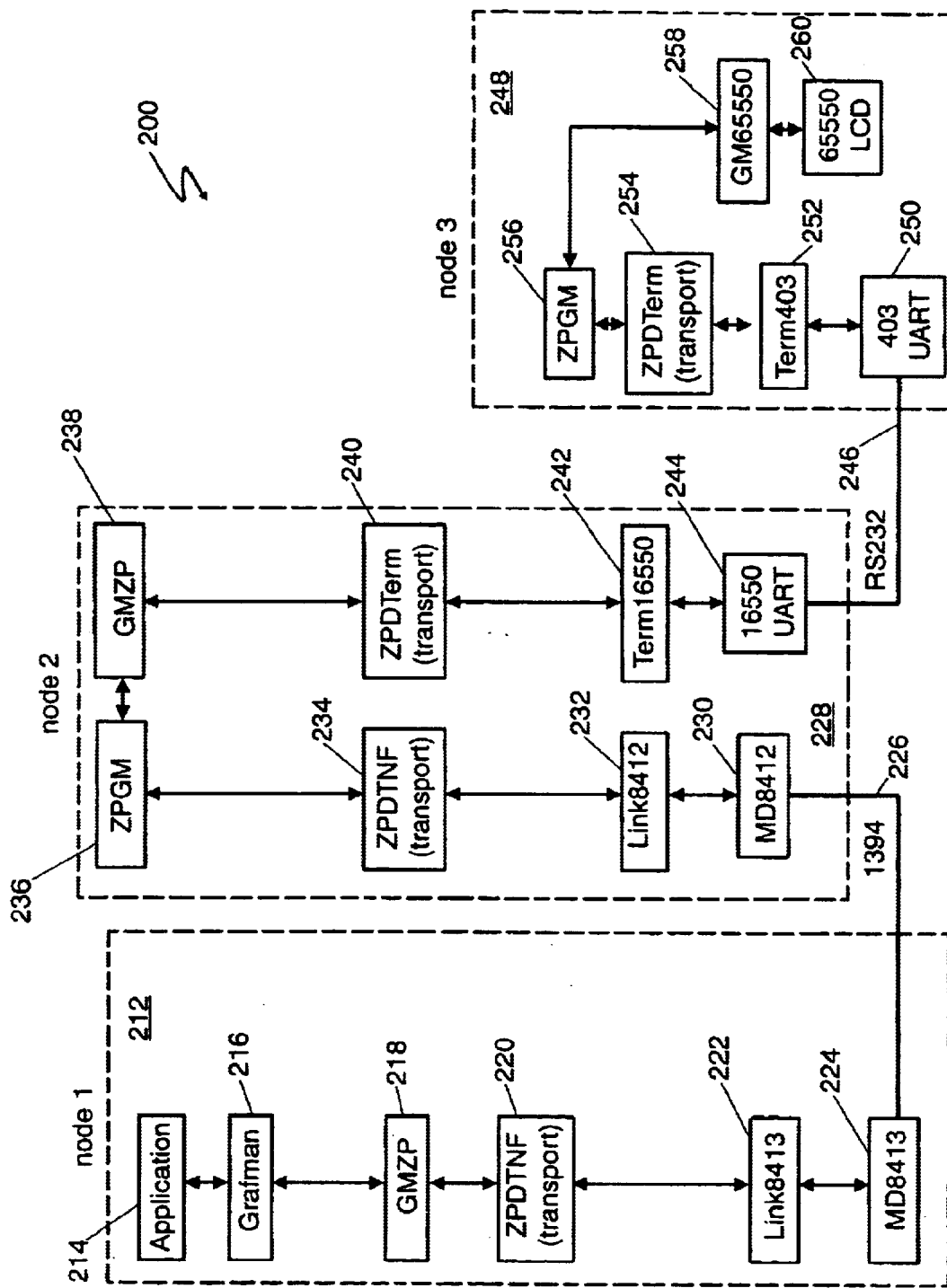
FIG. 3 is a schematic drawing of a second embodiment of the present invention.

Referring now to FIG. 3, wherein like components perform like functions as compared to the FIG. 2 components, a second exemplary embodiment 200 is depicted. This embodiment includes a local node 212 (node 1), a bridge node 228 (node 2), and a remote node 248 (node 3). The local node 212 is operatively coupled to the remote node 248 by means of a 1394 cable 226 and an RS232 cable 246 by way of the bridge node 228. As will be seen, the same general methodology will apply to this embodiment as was applied to the first embodiment.

In this example then, upon the sending of a communication path request by application 214 to the local device name stack services at GMZP 218, "/GMZP" is added to the local path string. Thereafter, the remainder of the local path is constructed by polling the ZPDTNF driver 220 and the link8413 driver 222. The result is a local path string depicted as "/GMZP/ZPDTNF/Link8413".

Thereafter, the GMZP device name stack service sends a message to the bridge node 228 ZPGM 236 (the bridge server driver) to construct its path. ZPGM's path consists of ZPGM and the drivers between ZPGM and node 1. Thus, ZPGM's path is constructed as follows, not unlike the remote message path of FIG. 2. First, the message stack list is constructed as "/ZPDTNF/Link8412". Then, the message path is reversed, resulting in "/Link8412/ZPDTNF". Thereafter, ZPGM appends itself to the string resulting in "/Link8412 ZPDTNF/ZPGM".

Then the bridge node ZPGM 236 passes the request for path information on to the node 2 GMZP client 238 which in turn constructs its local path as "/GMZP/ZPDTerm/Term16550". Bridge node 228 then adds the client string to its bridge string to form "/Link8412/ZPDTNF/ZPGM/GMZP/ZPDTerm/Term16550".

Thereafter, the bridge node 228 GMZP device stack message service sends the request on to the remote node 248 device stack message service at ZPGM 256. The node 3 device stack message service then constructs the message stack path as "/ZPDTerm/Term403" and then reverses it and appends ZPGM to it resulting in "/Term403/ZPDTerm/ZPGM". The ZPGM device stack message service then acquires the upstream or target device path as "GM6550" and appends that to the previously constructed string. The node 3 path thus becomes "/Term403/ZPDTerm/ZPGM/GM65550".

The node 3 device name stack service then sends the node 3 path string back to the node 2 device name message service which appends the node 3 string to the node 2 path string resulting in ""/Link8412/ZPDTNF/ZPGM/GMZP/ZPDTerm/Term16550/Term403/ZPDTerm /ZPGM/GM65550". The node 2 device name service then sends the combined path string to node 1. The node 1 device name message service then appends the node 3+2 path string to the node 1 and node 2 path string combination to obtain:

"/GMZP/ZPDTNF/Link8413/Link8412/ZPDTNF/ZPGM/ GMZP/ZPDTerm/Term16550/Term403/ZPDTerm /ZPGM/ GM65550". This communication path string is then reported back to the application 214 fulfilling the application request.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. In a system having a local node and a target node connected to a plurality of nodes located between said local node and said target node, such that multiple communication paths exist between the nodes of said plurality, a method of constructing a communication path string, the method comprising:

an application on a local node requesting communication path data;

in response to said request for communication path data, gathering driver information on a local node and adding said local node driver information to a message list;

recursively gathering driver information for nodes connected between said local node and said target node and sequentially adding said recursively gathered driver information to said message list until no more drivers remain to be added to said message stack list;

reversing the order of driver information contained in said message stack list;

recursively gathering upstream device driver information for each node connected between said target node and said local node, and adding said gathered upstream device information to an upstream stack driver list until no more drivers remain to be added to said upstream stack driver list;

appending said upstream stack list to said reversed order message stack list;

sending said reversed order message stack list and appended upstream stack list to local node; and appending said reversed order message stack list and appended upstream stack list to a local driver list.

2. The method of claim 1, wherein said reversed order message stack list and appended upstream stack list appended to said local driver list are presented in human-readable form to allow a user to choose a communication path.

3. The method of claim 1, wherein for distributed drivers, the device name stack service starts by performing activities with capabilities of regular local drivers to produce a list of names of drivers down to a lowest driver used for transmitting messages to a remote node.

4. The method of claim 3, wherein the device stack service sends a message to a remote node requesting its device name stack service.

5. The method of claim 4, wherein the remote device name stack service calls a device name stack service for its messaging stack and reverses the order of the list of driver names such that a lowest layer driver name is first and a highest layer driver name is last.

* * * * *